US012697192B2

(12) United States Patent
Lee et al.

(10) Patent No.: US 12,697,192 B2
(45) Date of Patent: Aug. 4, 2026

(54) DATA PROCESSING METHOD

(71) Applicant: MEDIT CORP., Seoul (KR)

(72) Inventors: Dong Hoon Lee, Seoul (KR); Ye Rin Cho, Seoul (KR)

(73) Assignee: MEDIT CORP., Seoul (KR)

( * ) Notice: Subject to any disclaimer, the term of this patent is extended or adjusted under 35 U.S.C. 154(b) by 263 days.

(21) Appl. No.: 18/219,490

(22) Filed: Jul. 7, 2023

(65) Prior Publication Data

US 2023/0346524 A1      Nov. 2, 2023

Related U.S. Application Data

(63) Continuation of application No. PCT/KR2022/000321, filed on Jan. 7, 2022.

(30) Foreign Application Priority Data

Jan. 8, 2021    (KR) ......................... 10-2021-0002772
Jan. 7, 2022    (KR) ......................... 10-2022-0002560

(51) Int. Cl.
*A61C 9/00*          (2006.01)
*A61C 7/00*          (2006.01)
(52) U.S. Cl.
CPC ............ *A61C 9/0053* (2013.01); *A61C 7/002* (2013.01)
(58) Field of Classification Search
CPC .............................. A61C 9/0053; A61C 7/002
USPC ....................................................... 382/128
See application file for complete search history.

(56) References Cited

U.S. PATENT DOCUMENTS

| | | | |
|---|---|---|---|
| 11,246,689 B2* | 2/2022 | Levin ................. | A61B 1/00045 |
| 12,076,114 B2* | 9/2024 | Kopelman ........... | A61B 5/0088 |
| 12,390,311 B2* | 8/2025 | Sabina ................. | A61C 9/0053 |
| 2006/0115793 A1* | 6/2006 | Kopelman ............. | A61C 19/04 |
| | | | 433/218 |
| 2018/0005433 A1* | 1/2018 | Kohler ................... | G06F 3/016 |
| 2020/0193871 A1* | 6/2020 | Levin .................... | G06F 3/0481 |
| 2020/0352686 A1 | 11/2020 | Yancey et al. | |

FOREIGN PATENT DOCUMENTS

| | | |
|---|---|---|
| KR | 10-2014-0039468 A | 4/2014 |
| KR | 10-2018-0121689 A | 11/2018 |
| KR | 10-2020-0042068 A | 4/2020 |
| KR | 10-2020-0099997 A | 8/2020 |

(Continued)

OTHER PUBLICATIONS

J. Thoma, M. Havlena, S. Stalder and L. Van Gool, "[Poster] Augmented Reality for User-Friendly Intra-Oral Scanning," 2017 IEEE International Symposium on Mixed and Augmented Reality (ISMAR-Adjunct), Nantes, France, 2017, pp. 97-102, doi: 10.1109/ISMAR-Adjunct.2017.41. (Year: 2017).*

(Continued)

*Primary Examiner* — Jennifer Mehmood
*Assistant Examiner* — Eric James Shoemaker

(57)            ABSTRACT

A data processing method according to the present invention comprises the step of: loading at least a part of sample data corresponding to a training model into a user interface; matching the sample data with scan data obtained by scanning the training model; and assessing the scan data on the basis of a result of the matching between the scan data and the sample data.

19 Claims, 17 Drawing Sheets

```
                    ┌─────────┐
                    │  START  │
                    └────┬────┘
                         │
     ┌───────────────────────────────────────┐
     │ LOAD AT LEAST PART OF SAMPLE DATA      │
     │ CORRESPONDING TO TRAINING MODEL        │──S110
     │ INTO USER INTERFACE                    │
     └───────────────────┬───────────────────┘
                         │
     ┌───────────────────────────────────────┐
     │ SET SCAN DIFFICULTY OF SAMPLE DATA     │──S120
     └───────────────────┬───────────────────┘
                         │
     ┌───────────────────────────────────────┐
     │ MATCH SCAN DATA OBTAINED BY            │
     │ SCANNING TRAINING MODEL WITH           │──S130
     │ SAMPLE DATA                            │
     └───────────────────┬───────────────────┘
                         │
     ┌───────────────────────────────────────┐
     │ CALCULATE SCAN PROGRESS RATE OF        │──S140
     │ TRAINING MODEL BASED ON SCAN DATA      │
     └───────────────────┬───────────────────┘
                         │
     ┌───────────────────────────────────────┐
     │ EVALUATE SCAN DATA BASED ON            │
     │ MATCHING RESULT OF SCAN DATA AND       │──S150
     │ SAMPLE DATA                            │
     └───────────────────┬───────────────────┘
                         │
                    ┌────┴────┐
                    │   END   │
                    └─────────┘
```

(56)  References Cited

FOREIGN PATENT DOCUMENTS

KR      10-2020-0114710  A      10/2020

OTHER PUBLICATIONS

Visual feedback after dataset optimization during 3D surface recon-struction. An IP.com Prior Art Database Technical Disclosure Authors et. al.: Disclosed Without Attribution. IP.com No. IPCOM000246954D. IP.com Electronic Publication Date: Jul. 18, 2016 (Year: 2016).*
International Search Report mailed Apr. 12, 2022 for International Application No. PCT/KR2021/000321 and its English translation.

* cited by examiner

START

LOAD AT LEAST PART OF SAMPLE DATA CORRESPONDING TO TRAINING MODEL INTO USER INTERFACE — S110

SET SCAN DIFFICULTY OF SAMPLE DATA — S120

MATCH SCAN DATA OBTAINED BY SCANNING TRAINING MODEL WITH SAMPLE DATA — S130

CALCULATE SCAN PROGRESS RATE OF TRAINING MODEL BASED ON SCAN DATA — S140

EVALUATE SCAN DATA BASED ON MATCHING RESULT OF SCAN DATA AND SAMPLE DATA — S150

END

FIG. 6

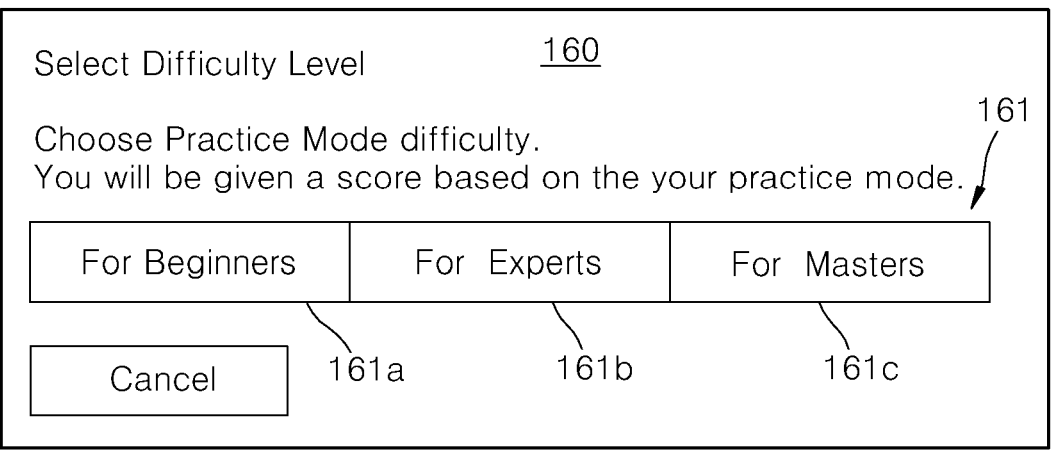

Select Difficulty Level     <u>160</u>

Choose Practice Mode difficulty.     161
You will be given a score based on the your practice mode.

| For Beginners | For Experts | For Masters |

Cancel    161a     161b     161c

FIG. 7

| DIFFICULTY LEVEL \ CONDITION | For Beginners | For Experts | For Masters |
|---|---|---|---|
| SCAN TIME | $\leq 160s$ | $\leq 140s$ | $\leq 120s$ |
| SCAN SHOTS | $\leq 2500shots$ | $\leq 2000shots$ | $\leq 1500Sshots$ |
| MARKER UNIT CHANGE TIME POINT | 20shots | 10shots | 5shots |
| Deviation | $\leq d_1$ | $\leq d_2$ | $\leq d_3$ |
| BLANK AREA | $\leq 10$ | $\leq 5$ | $\leq 3$ |

FIG. 16
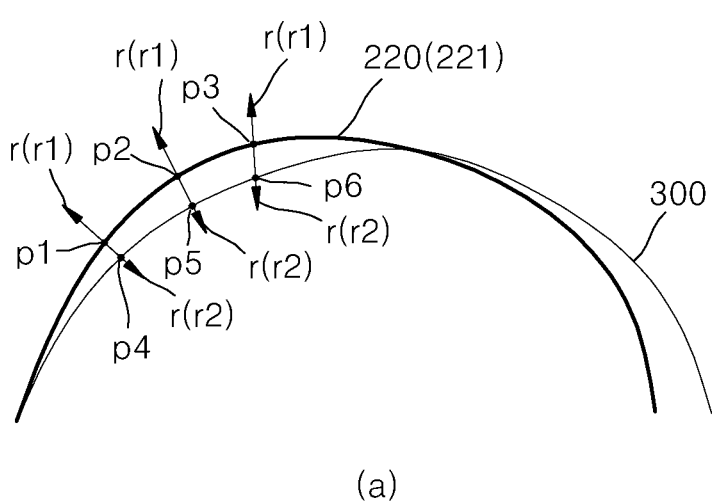
(a)
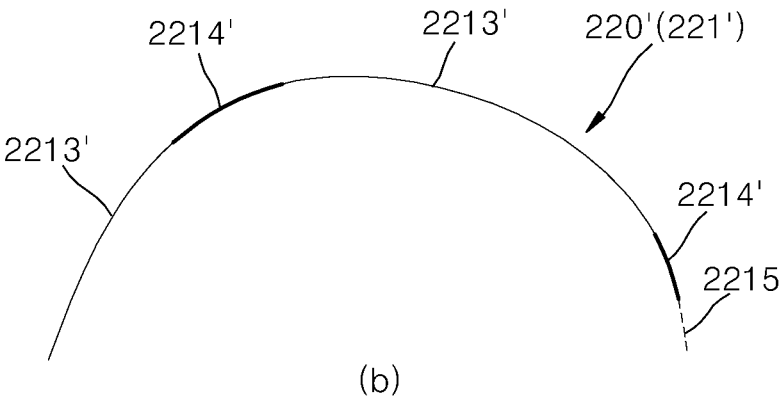
(b)

Check practice Mode Results   <u>500</u>    520

Your Results Summary    Difficulty Level 511    510

512

You are the
true Expert.

◷ Scan Time                  3m 8s
⊘ Progress Rate              100%
⠿ Data Reliability Ratio      80%
◌ Number of Major Holes        1
+ Matching Rate              92%

Tip: The large the graph is,
   Tithe higher the score is.    521        522

Close

924

DATA PROCESSING METHOD

CROSS-REFERENCE TO RELATED APPLICATIONS

This application is a continuation application of International Application No. PCT/KR2022/000321, filed Jan. 7, 2022, which claims the benefit of Korean Patent Application Nos. 10-2021-0002772, filed Jan. 8, 2021; and 10-2022-0002560, filed Jan. 7, 2022, in the Korean Intellectual Property Office, the disclosures of which are incorporated herein in their entirety by reference.

TECHNICAL FIELD

The present disclosure relates to a data processing method.

BACKGROUND ART

Three-dimensional (3D) scanning and modeling technology has been frequently used in the CAD/CAM field and the reverse engineering field in recent dental industries, and in order to obtain 3D models representing the patient's oral cavity, usage of handheld type scanners is on the rise.

In the related art, 3D data of a target object (e.g., a plaster model made through modeling of the patient's oral cavity) is obtained by seating the plaster model on a tray of a table type scanner and rotating and tilting the tray. In case of using the table type scanner, a user can obtain the 3D data without particular difficulty. However, in case of using the handheld type scanner, the user's scanning proficiency is directly related to the precision of the 3D data, and thus there is a need for a user to train a process of scanning the target object in order to obtain precise data.

Meanwhile, the user may improve his/her own scanning proficiency by scanning the patient's actual oral cavity, but there exists a problem in that it is unable to evaluate the scanning proficiency practically.

Accordingly, there is a need for a method capable of evaluating the user's scanning proficiency according to predetermined evaluation criteria while improving the user's scanning proficiency.

DISCLOSURE

Technical Problem

In order to solve the above problem, the present disclosure provides a data processing method which evaluates scan data by providing sample data of a training model so that a user of a scanner can improve scanning proficiency and by comparing the scan data obtained by scanning the training model with the sample data.

The technical problems of the present disclosure are not limited to the above-described technical problems, and other unmentioned technical problems may be clearly understood by those skilled in the art from the following descriptions.

Technical Solution

In order to solve the above object, a data processing method according to the present disclosure includes: loading at least a part of sample data corresponding to a training model into a user interface; matching scan data obtained by scanning the training model with the sample data; and evaluating the scan data based on the result of matching the scan data and the sample data with each other.

The data processing method according to the present disclosure may further include various additional constitutions including the above-described constitution.

Advantageous Effects

According to the above-described problem solving means and the detailed contents to be described later, by using the data processing method according to the present disclosure, a user can get qualitative and quantitative evaluation of scan data obtained by scanning a training model, and can improve scanning proficiency.

Further, by using the data processing method according to the present disclosure, it can be easily displayed whether a user proceeds with scan training correctly through marker units being displayed together, and the user can naturally improve scanning proficiency by performing the scan training in accordance with directions indicated by the marker units.

Further, according to the data processing method according to the present disclosure, different standards are given to evaluation elements for evaluating scan data for each level of difficulty determined in accordance with a user's selection, and thus the user can improve scanning proficiency step by step even if the user uses one training model.

DESCRIPTION OF DRAWINGS

FIG. 6 is to explain a process of setting a scan difficulty level.

FIG. 7 is to explain evaluation elements having different standards in accordance with the scan difficulty level.

FIG. 16 is to explain a process of calculating a matching rate in step S130.

EXPLANATION OF SYMBOLS

Figure 1:
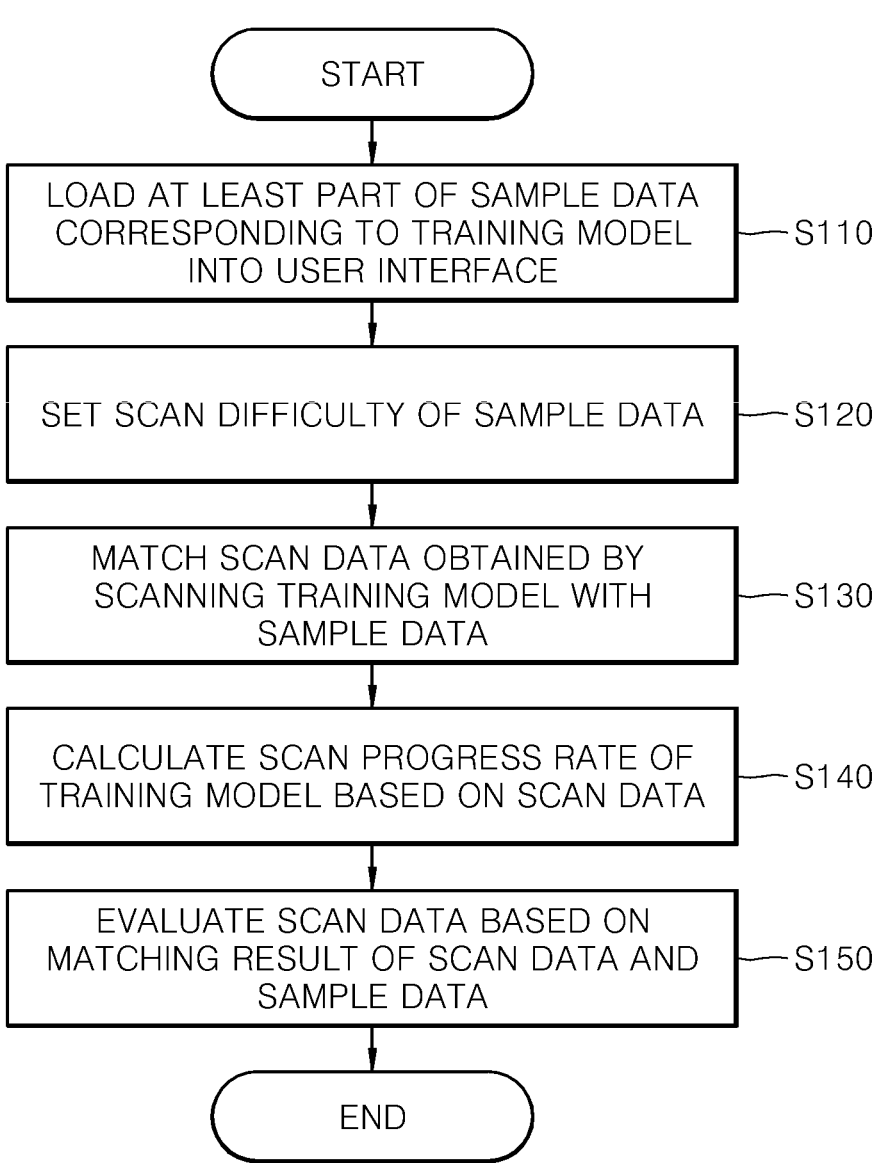
FIG. 1 is a flowchart of a data processing method according to the present disclosure.

S110: step of loading
S120: step of setting a scan difficulty level
S130: step of matching
S140: step of calculating a scan progress rate
S150: step of evaluating
10: training model 11: identifier
100, 200: user interface 130: training mode entry button
161: difficulty level selection unit 220: sample data
221: oral cavity sample data 222: marker unit
222*a*: initial marker unit 230: scan training menu
240: state display unit 2221: bounding box
2222: center of bounding box 400: reliability data
500: result window
900: data processing system
910: scanning unit
920: controller
930: display unit

MODE FOR INVENTION

Hereinafter, some embodiments of the present disclosure will be described in detail with reference to the exemplary drawings. In adding reference numerals to constituent elements in the drawings, it is to be noted that the same constituent elements have the same reference numerals as much as possible even if they are represented in different drawings. Further, in explaining embodiments of the present disclosure, the detailed explanation of related known configurations or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

FIG. 1 is a flowchart of a data processing method according to the present disclosure.

Referring to FIG. 1, a data processing method according to the present disclosure includes: loading at least a part of sample data corresponding to a training model into a user interface (S110); setting a scan difficulty level of the sample data (S120); matching scan data obtained by scanning the training model with the sample data (S130); calculating a scan progress rate of the training model based on the scan data (S140); and evaluating the scan data (S150).

Hereinafter, each step of a data processing method according to the present disclosure will be described in detail.

Figure 2:
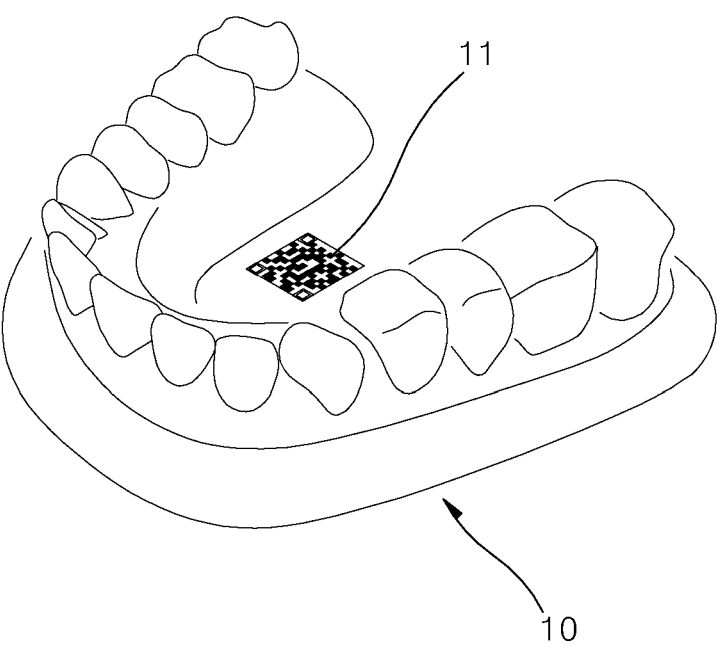
FIG. 2 is to explain a training model.

FIG. 2 is to explain a training model 10.

Referring to FIGS. 1 and 2, in step S110, at least a part of sample data corresponding to a training model 10 is loaded into a user interface. In FIG. 2, a training model 10 for using the data processing method according to the present disclosure is illustrated. In order to improve user's scan proficiency, the training model 10 may be a kind of model of which repeatable practices are possible. Exemplarily, the training model 10 may be a plaster model made through modeling of an actual oral cavity. However, it is not always necessary that the training model 10 is made through modeling of the actual oral cavity, and may be a plaster model which is produced by imitating the form of an oral cavity and represents a virtual oral cavity shape.

The training model 10 may have sample data corresponding to the training model 10. Exemplarily, the sample data may be generated by mounting the training model 10 on a tray of a table scanner and precisely performing 3D scanning of the training model 10. That is, the sample data may be complete 3D data of the training model 10. Accordingly, the sample data may match with the scan data obtained in the scanning process, and may be used as reference data for evaluating the scan data.

Meanwhile, the sample data may be the original data of the training model 10. Exemplarily, the training model 10 may be obtained by performing 3D stereoscopic printing of the sample data generated through a CAD work, and the training model 10 may have the same shape as the shape of the sample data.

The training model 10 may represent at least one tooth and a gingiva. Further, the training model 10 may have a predetermined identifier 11 on a part (e.g., hard palate part or sublingual part) other than the part representing the tooth and the gingiva. Exemplarily, the identifier 11 may have unique information of the training model 10, such as a bar code, QR code, and serial number. The identifier 11 may be formed on at least a part of an outer surface of the training model 10 in an embossed or intaglio manner, or may be formed through printing and attachment.

Figure 3:
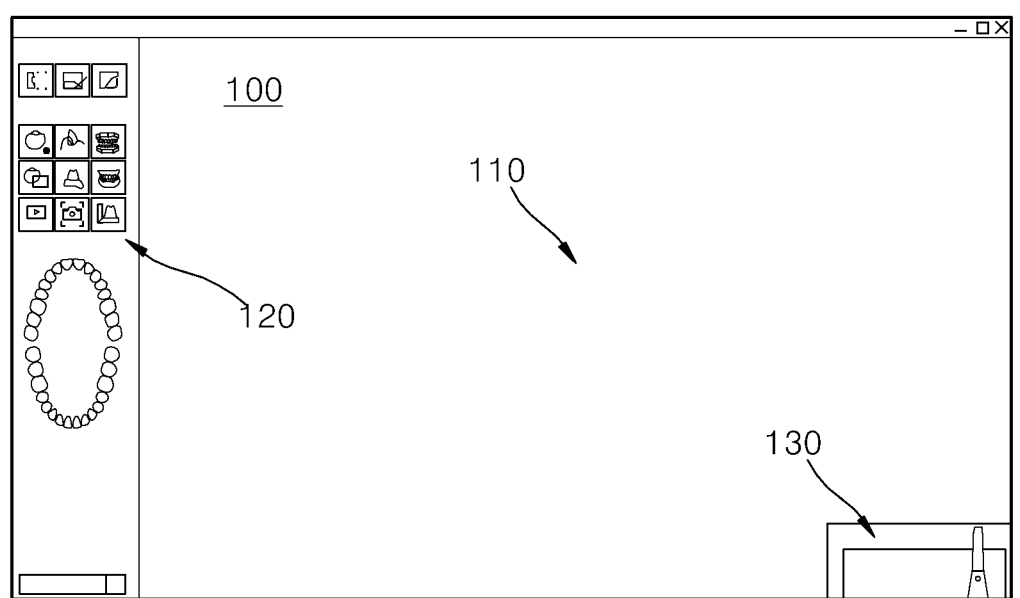
FIG. 3 is a user interface screen on which a data processing method according to the present disclosure is displayed.
Figure 4:
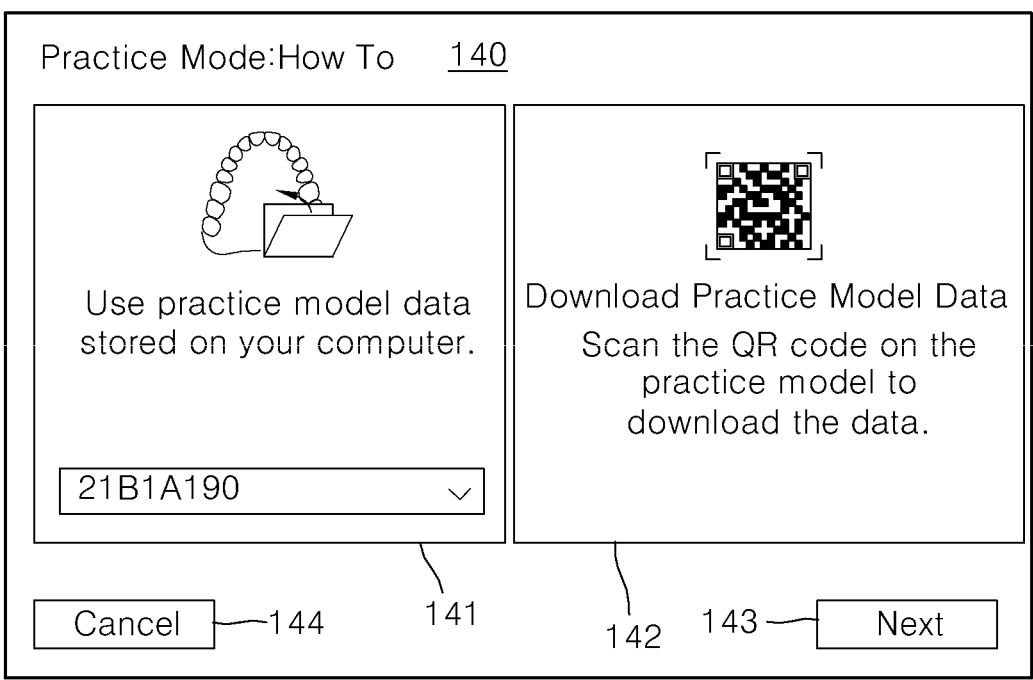
FIG. 4 is to explain a process of loading sample data representing a training model in order to enter a training mode on the user interface screen of FIG. 3.
Figure 5:
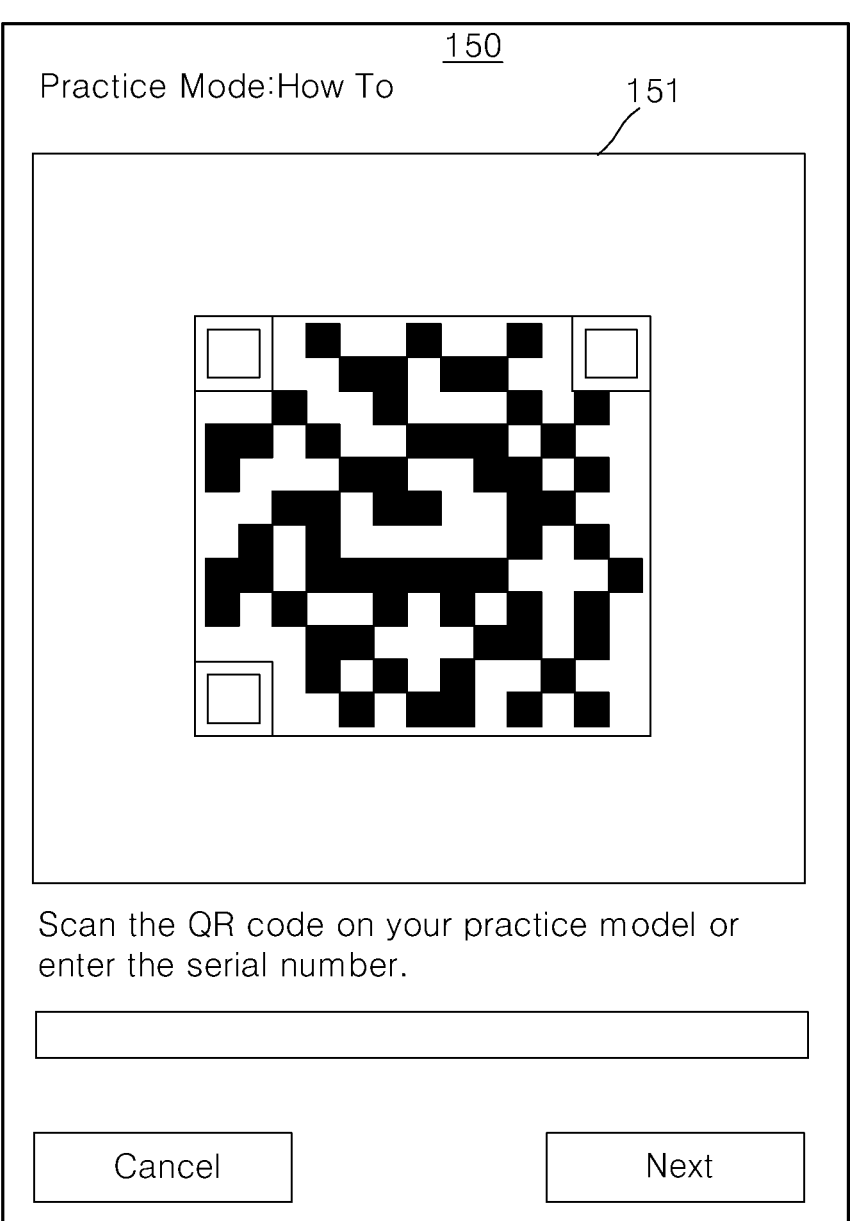
FIG. 5 is to explain a process of detecting an identifier formed on a training model.

FIG. 3 is a user interface 100 screen on which a data processing method according to the present disclosure is displayed. FIG. 4 is to explain a process of loading sample data representing a training model 10 in order to enter a training mode on the user interface 100 screen of FIG. 3. FIG. 5 is to explain a process of detecting an identifier 11 formed on a training model 10.

Referring to FIG. 3, a user interface 100 screen is provided. The user interface 100 screen may visually represent a scanning process. The user interface 100 screen includes a work space 110 in which at least one of sample data, scan data, and reliability data representing reliability of the scan data is displayed. Exemplarily, in the work space 110, the sample data may be displayed, the scan data may be displayed, or the scan data and the sample data may be displayed together in order to represent a state that the scan data matches with the sample data. Further, in the work space 110, the reliability data representing the reliability of the scan data may be displayed, and the scan data representing the texture of the scanned training model and the reliability data may be displayed together. Further, in the work space 110, additional information related to the above-described data may be displayed. On one side of the work space 110, a tool box 120 may be formed. The tool box 120 includes various buttons for editing and analyzing data disposed therein, and enables a user to do activities, such as selecting and trimming a predetermined part of the scan data in the form of a polygon, setting a margin line, or performing calibration of a scanner.

Meanwhile, on one side of the work space 110, a training mode entry button 130 for entering a scan training mode may be disposed. The user may perform a training process in which a scanning process can be practiced through selection of the training mode entry button 130.

Referring to FIG. 4, the user may select the training mode entry button 130 to generate a sample data selection window 140. The sample data selection window 140 may include a sample data search unit 141 and an identifier scanning unit 142. The user may select the sample data corresponding to the training model 10 from a local database through a user input by selecting the sample data search unit 141. In contrast, the user may select an identifier scanning unit 142, and may load the sample data corresponding to information stored in an identifier 11 from the local database or download the sample data online through detection of the identifier 11 formed on the training model 10 through the scanner. The user may select the sample data search unit 141 or the identifier scanning unit 142, and may proceed with a next step by selecting a progress button 143. Further, in case of selecting a cancel button 144, the user may cancel the entry to the training mode, and may return to the previous user interface 100 screen.

Referring to FIG. 5, an identifier scan window 150 entered through selection of the identifier scanning part 142 is illustrated. The identifier scan window 150 may include an identifier scan screen 151 for displaying an image input to a camera built in the scanner in real time, and may capture an image of the identifier 11 of the training model 10. The identifier 11 is detected by the camera, and the sample data corresponding to the training model 10 in which the identifier 11 is formed is loaded based on the information owned by the identifier 11. Meanwhile, in case that the identifier 111 is not easily detected, the sample data corresponding to the training model 10 may be loaded by directly inputting a serial number onto a serial number input column.

FIG. 6 is to explain a process of setting a scan difficulty level, and FIG. 7 is to explain evaluation elements having different standards in accordance with the scan difficulty level.

Referring to FIG. 6, if the sample data corresponding to the training model 10 is loaded, a step (S120) of setting a scan difficulty level of the sample data may be performed. In the step (S120) of setting the scan difficulty level of the sample data, at least one of scan difficulty levels may be input from a user. Exemplarily, on a scan difficulty level selection unit 161 of a scan difficulty level selection window 160, a difficulty level selection button 161a for beginners, a difficulty level selection button 161b for experts, and a difficulty level selection button 161c for masters may appear. The user who will perform the scan training may select a proper difficulty level in accordance with the user's scan proficiency.

Referring to FIG. 7, evaluation elements for evaluating the scan data and evaluation threshold values are shown. In this case, different evaluation threshold value of the evaluation elements may be set by the scan difficulty levels. Exemplarily, if the scan is completed within 160 seconds in case of the difficulty level for beginners, it may be determined that the training has been completed excellently. In comparison to this, if the scan is completed within 140 seconds in case of the difficulty level for experts, it may be determined that the slash (/) training with a threshold value has been completed excellently, and if the scan is completed within 120 seconds in case of the difficulty level for masters, it may be determined that the training has been completed excellently. As described above, as the scan difficulty level is set to be higher, the evaluation standards of the evaluation elements may be set to be higher.

Meanwhile, if the evaluation values of the evaluation elements exceed an evaluation threshold value in the scan training process, the user's evaluation ratings for the scan time may be lowered. Exemplarily, in case of the difficulty level for beginners, if the scan time is within 60 seconds, 5 points may be awarded, and if the scan time exceeds 60 seconds and is within 70 seconds, 4 points may be awarded. If the scan time exceeds 70 seconds and is within 80 seconds, 3 points may be awarded, and if the scan time exceeds 80 seconds and is within 90 seconds, 2 points may be awarded. If the scan time exceeds 90 seconds, 1 point may be awarded. That is, the evaluation ratings may be differently awarded in accordance with the scan times.

Meanwhile, the evaluation element may include at least one of a scan time, a scan progress rate according to a marker unit, a ratio of voxel data satisfying threshold reliability, the number of blank areas, a matching rate between scan data and sample data, the number of scan shots, and FPS. The evaluation rating for each evaluation element may be comprehensively considered in order to evaluate the user's scan proficiency.

Hereinafter, a process of loading sample data 220 together with marker data will be described.

Figure 8:
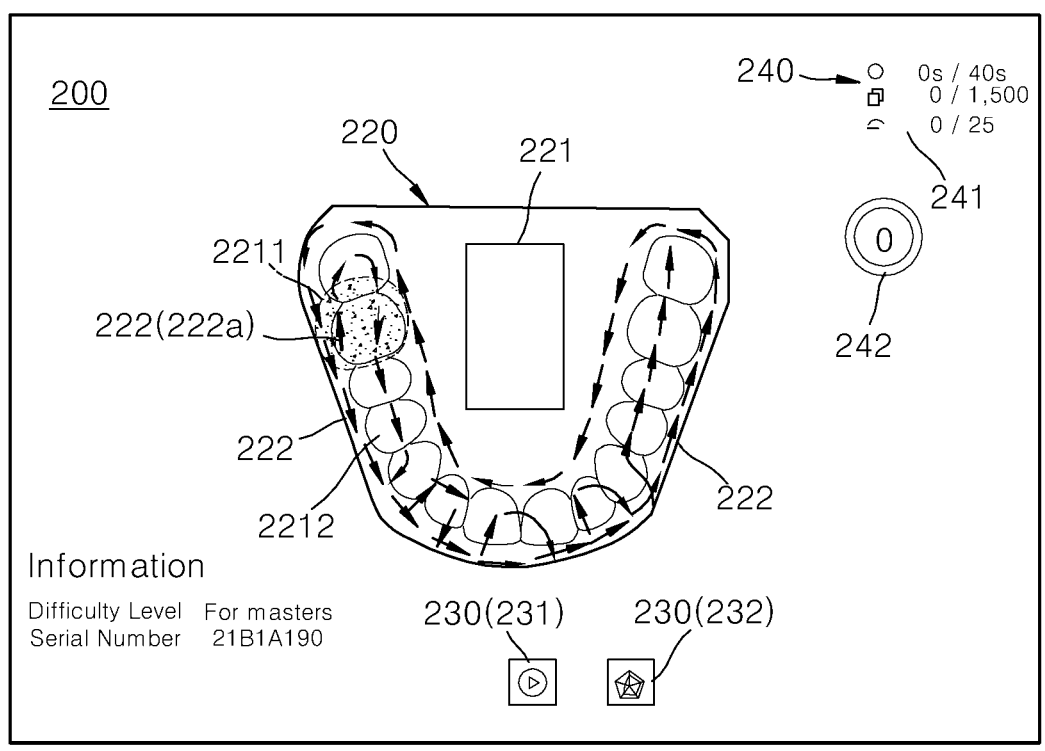
FIG. 8 is to explain a state in which sample data representing a training model is loaded together with marker data representing a predetermined scan path.

FIG. 8 is to explain a state in which sample data 220 representing a training model 10 is loaded together with marker data representing a predetermined scan path.

After the step (S110) of loading and the step (S120) of setting the scan difficulty level, the sample data 220 representing the training model 10 is displayed on a user interface 200 screen. Since the user interface 200 screen appears after entering the training mode, it may differ from the above-described user interface 100 screen. The user interface 200 screen may display the serial number of the training model 10 and the difficulty level information selected by the user on one side thereof. The user may identify whether the training model 10 being scanned and the loaded sample data 220 coincide with each other, and also may easily identify the selected difficulty level.

Further, on the user interface 200 screen, various kinds of additional information may be displayed. Exemplarily, on the user interface 200 screen, at least one scan training menu 230 is disposed. The scan training menu 230 may include a training start/stop button 231 and a scan data evaluation button 232. The user may start or stop the scan process by selecting the training start/stop button 231. If the scan process starts through selection of the training start/stop button 231, information for evaluating the scan data for each evaluation element may be collected. Meanwhile, if the scan process stops through selection of the training start/stop button 231, the scan process is ended, and the scan data may be evaluated based on the obtained scan data. The evaluation result of the scan data may be identified through selection of the scan data evaluation button 232.

Further, when the scan training process is performed, a state display unit 240 may be displayed on one side of the user interface 200 screen. The state display unit 240 may display the scan progress situation according to the scan process in real time. The state display unit 240 may include an evaluation element display unit 241 and a scan progress rate display unit 242.

The evaluation element display unit 241 may display the measurement result for each evaluation element. Exemplarily, the evaluation element display unit 241 may display a scan time according to the scan process, the number of scan shots, and frame per second (fps) in real time. Further, an evaluation threshold value of each evaluation element may be displayed through division by a slash (/) sign. However, the present disclosure is not limited to the drawings being exemplarily explaining the present disclosure. That is, it is not absolutely necessary to display the evaluation threshold value on the evaluation element display unit 241, and even if the evaluation threshold value is displayed, it may not be displayed through the division by the slash (/) sign.

The scan progress rate display unit 242 may display the calculated scan progress rate. The scan progress rate may be increased based on a distance between the scan shot constituting the scan data and the marker data. Meanwhile, a process of calculating the scan progress rate will be described later.

Hereinafter, the sample data 220 will be described in more detail.

The sample data 220 may include oral sample data 221 and marker data. The oral sample data 221 may mean digital 3D data of the training model 10 corresponding to the training model 10. At least a part of the oral sample data 221 may be formed of voxel data including shape information of at least a part of the training model 10. Exemplarily, the oral sample data 221 of the sample data 220 may include an alignable area 2211 that is aligned with the scan data in a scanning process to be described later and a non-alignable area 2212 that is not aligned with the scan data. In this case, the alignable area 2211 is formed of voxel data including shape information of the training model 10, and if the scan data is input, the scan data may be easily aligned with the sample data 220. Meanwhile, the non-alignable area 2212 may not have shape information of the part of the corresponding training model 10. However, the non-alignable area 2212 is not necessarily limited thereto, and may not be aligned with the scan data although the non-alignable area 2212 is formed of shell data having the shape information of the training model 10.

Meanwhile, the training model 10 has an initial scan location corresponding to the alignable area 2211. Exemplarily, the initial scan location may be a location including at least a part of a second molar tooth. The user may obtain the scan data by first scanning the initial scan location, and the scan data corresponding to the initial scan location may be aligned with the sample data 220 based on flexion information included in the voxel data forming the alignable area 2211.

Figure 9:
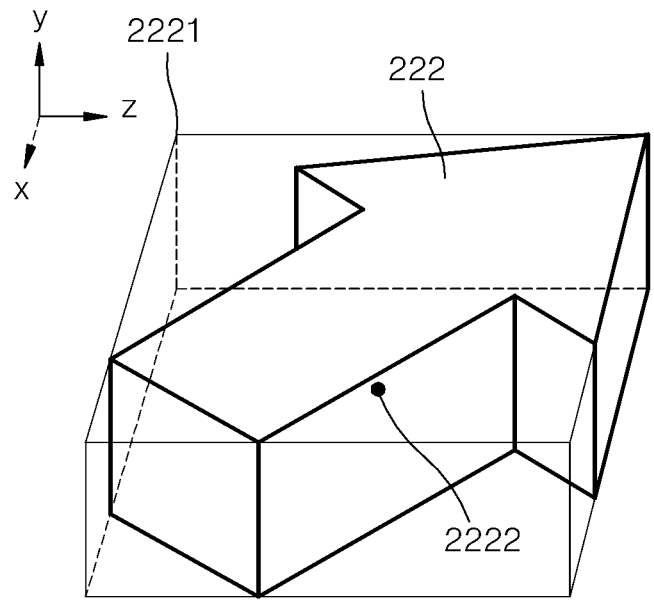
FIG. 9 is to explain marker data.

FIG. 9 is to explain marker data.

Referring to FIGS. 8 and 9, the step (S110) of loading may load the marker data together on the sample data 220. More specifically, the marker data may represent a predetermined scan path for obtaining the scan data. The marker data may include at least one marker unit 222. Exemplarily, the marker data may include a plurality of marker units 222, and the marker units 222 are displayed in 2D or 3D shapes having directivity. Exemplarily, the marker units 222 may be displayed in the shape of a 3D arrow, and the end of one marker unit 222 indicates the start of another marker unit 222 to form at least one closed loop scan path. The number of marker units 222 may be differently determined depending on the scan difficulty level determined in accordance with the user's selection.

As illustrated in FIG. 9, the marker unit 222 of the marker data may have a predetermined volume. In this case, a bounding box 2221 forming the contour of the marker unit 222 may be formed. The bounding box 2221 may have a cuboidal shape, but is not necessarily limited thereto. The center 2222 of the bounding box may be set as the center of the marker data (more specifically, marker unit), and may be used to calculate the scan progress rate based on the distance between the scan shot constituting the scan data and the marker data.

Meanwhile, at least some of the marker units 222 may be formed spaced apart for a predetermine distance from the sample data 220. Exemplarily, the marker unit 222 may be formed spaced apart for the predetermined distance from the center of the tooth part of the sample data 220. Accordingly, the marker unit 222 may be formed along an outer surface of the tooth part of the sample data 220, and the marker unit 222 may guide a tooth scan strategy to the user who performs the scan training in more detail.

Further, the marker data may include an initial marker unit 222a. Accordingly, the initial marker unit 222a may be loaded on the sample data 220 together with other marker units 222. The initial marker unit 222a may be displayed differently from other marker units 222. Exemplarily, the initial marker unit 222a may be displayed in green, and other marker units 222 may be displayed in the shape having a second pattern. The initial marker unit 222a may represent a point where the scan data should be obtained for the first time in the scan training process. Exemplarily, the initial marker unit 222a may be displayed on a part of the sample data 220 corresponding to the alignable area 2211.

Hereinafter, the step (S130) of matching will be described in detail.

Figure 10:
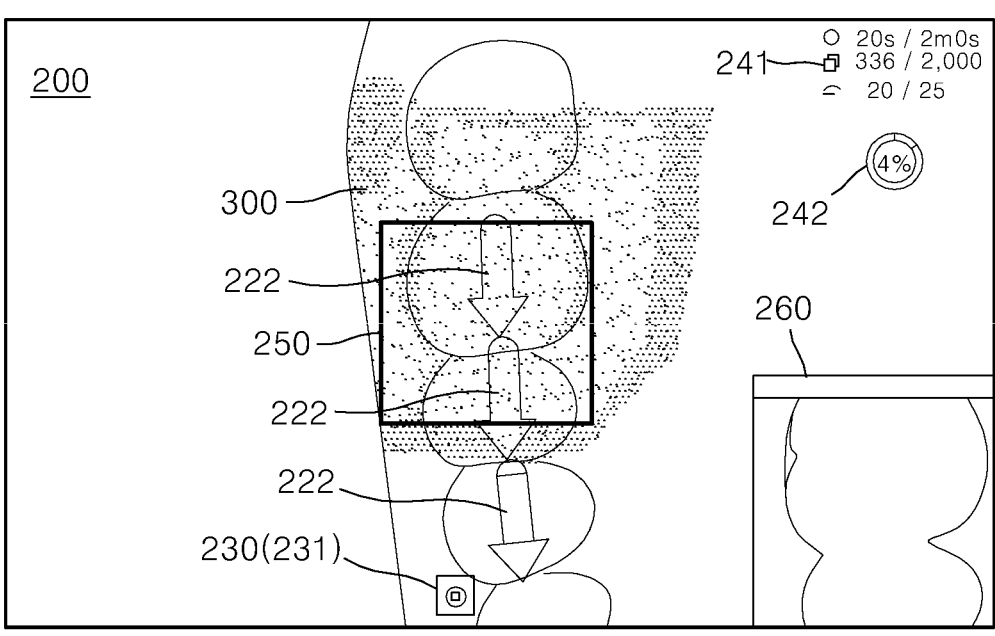
FIG. 10 is to explain a process of matching scan data by performing a scanning process.

FIG. 10 is to explain a process of matching scan data 300 by performing a scanning process.

Referring to FIGS. 1, 8, and 10, the data processing method according to the present disclosure includes the step (S130) of matching the scan data 300 obtained by scanning the training model 10 with the sample data. The step (S130) of matching may perform a process in which the scan data 300 is aligned with the sample data in the alignable area 2211 to be described later and/or a process in which a plurality of scan shots included in the scan data 300 are mutually aligned with each other. Further, the step (S130) of matching may collect an evaluation element measurement value including a matching rate between the scan data 300 and the sample data, being obtained together as the scan data 300 is obtained.

If the scanning process starts through selection of the training start/stop button 231, the scan data may be obtained in the unit of a scan shot through the scanner. In this case, the scan shot may be a 3D data piece constituting the scan data representing the shape and/or the color of the training model 10 through scanning of the training model 10. The scan data may include a plurality of scan shots, and the scan shots may be aligned with the sample data or may be mutually aligned with each other. Meanwhile, as the scan data 300 is obtained, information for evaluating the scan data for each evaluation element, that is, an evaluation element measurement value may be collected.

Exemplarily, the evaluation element display unit 241 may display the collected scan time, the number of scan shots, and fps in real time. Further, exemplarily, letters representing the evaluation element measurement value may be changed depending on the size of the evaluation element measurement values being displayed on the evaluation element display unit 241 in real time. For example, with respect to the evaluation element measurement value that exceeds 70% of the evaluation threshold value, the letters representing the evaluation element measurement value may be changed from green to orange. Further, with respect to the evaluation element measurement value that exceeds 100% of the evaluation threshold value, the letters representing the evaluation element measurement value may be changed from orange to red. In addition, the letters representing the evaluation element measurement value may be changed to another color depending on the degree that exceeds the evaluation threshold value (i.e., as the evaluation rating is lowered). As described above, since it is possible to provide a feedback to the user even in the scanning process through the letter color of the evaluation element measurement value, the user can complement the insufficient evaluation element. However, unlike the above-described exemplary contents, the letters representing the evaluation element measurement value may have a single color regardless of whether the measurement value exceeds the evaluation threshold value.

Further, on one side of the user interface 200 screen, a real time screen 260 may be additionally displayed. The real time screen 260 may display a 2D image being obtained through a camera of a scanner in real time.

Meanwhile, the user may scan a part of the training model 10 corresponding to the part on which the initial marker unit 222*a* is displayed. The part of the training model 10 corresponding to the part on which the initial marker unit 222*a* is displayed may be the alignable area 2211 of the sample data 220. In this case, since the alignable area 2211 is formed of voxel data, the scan shots of the scan data 300 corresponding to the alignable area 2211 may be aligned with the sample data 220.

Thereafter, the user may perform the scanning process in accordance with the marker units 222, and the part of the training model 10 being scanned by the user may be the part corresponding to a non-alignable area 2212 of the sample data 220. In this case, the scan shots obtained by scanning the corresponding part of the training model 10 may not be aligned with the sample data 220, but may be aligned with the scan shots obtained just before. That is, the alignable area 221 may operate as a reference area in which the scan data 300 is aligned with the sample data 220, and the non-alignable area 2212 may operate as an area for measuring the scan proficiency.

Hereinafter, a process of changing the scan progress rate and a process of displaying a marker unit 222 with the progress of the scanning process will be described.

Figure 11:
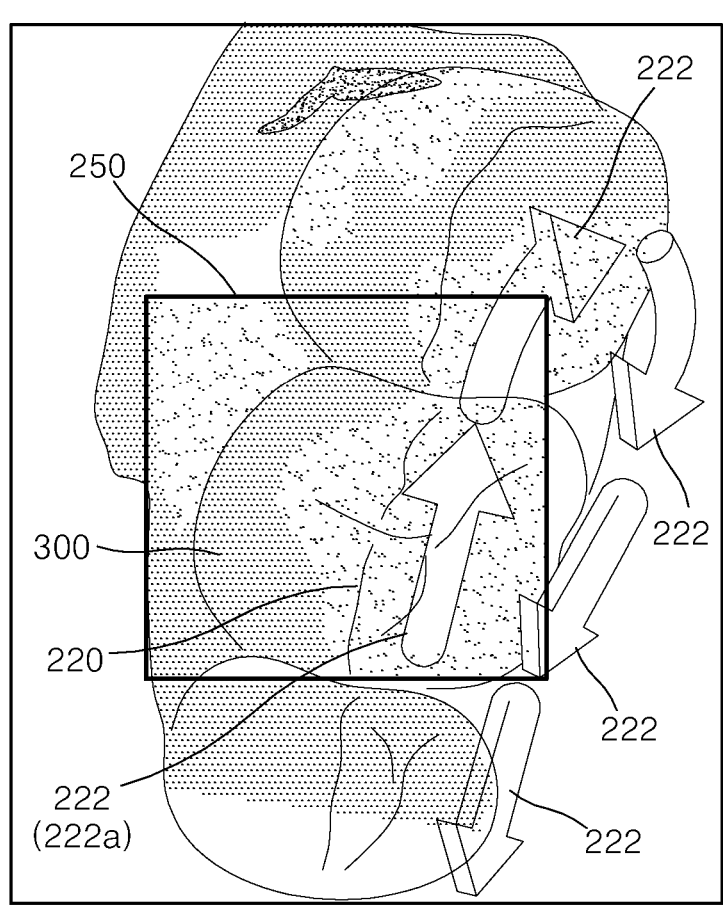
FIGS. 11 to 13 are to explain a scanning process being performed in accordance with a direction indicated by marker units.
Figure 12:
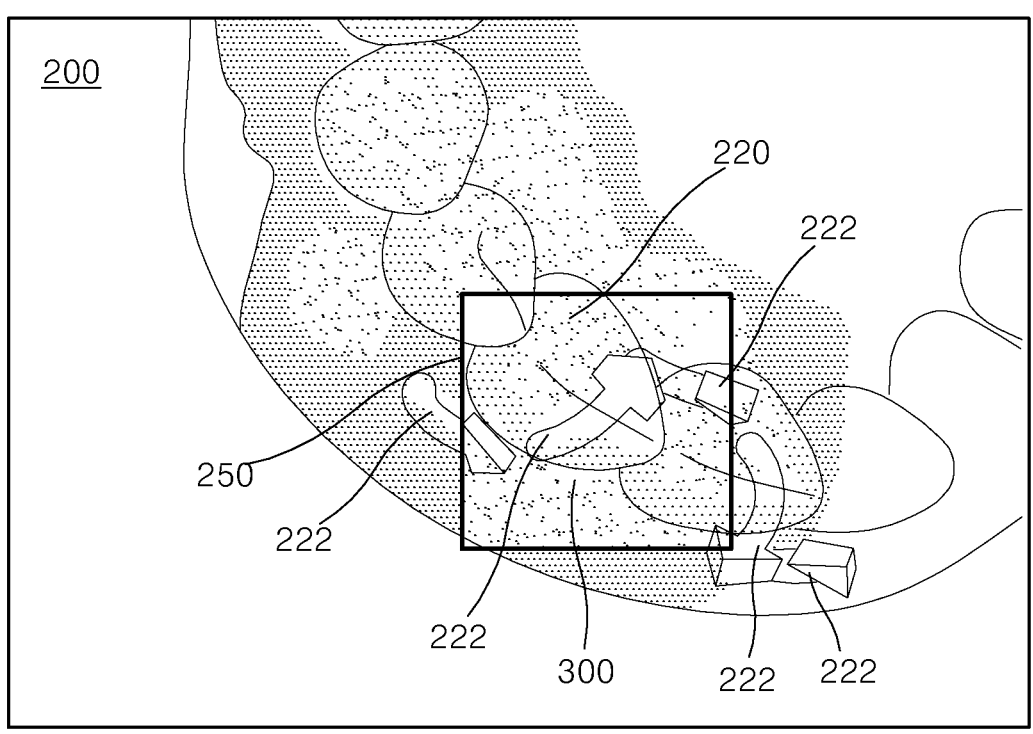
Figure 13:
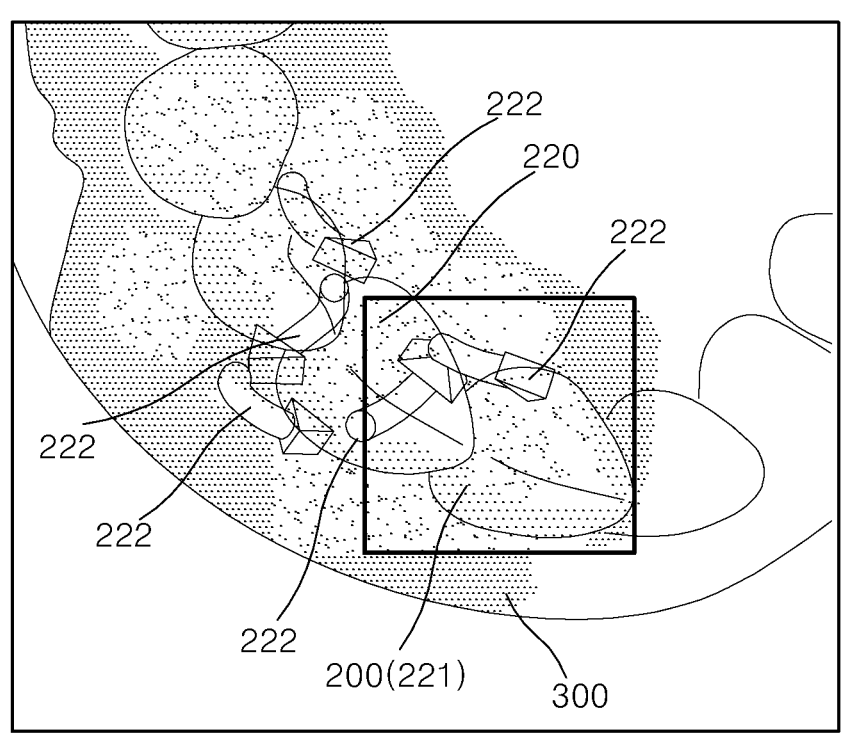

FIGS. 11 to 13 are to explain a scanning process being performed in accordance with a direction indicated by marker units 222.

Referring to FIGS. 1, 11, and 12, the data processing method according to the present disclosure further includes a step (S140) of calculating the scan progress rate of the training model 10 based on the obtained scan data 300. Exemplarily, on the user interface 200 screen, a part that is currently being scanned is displayed in the form of a scan frame 250. Meanwhile, the user may perform the scan so that the marker unit 222 is included inside the scan frame 250. If the scan is performed so that the marker unit 222 is included inside the scan frame 250, it may be determined that the user is performing the scan by correctly aiming the training model 10. If the user smoothly performs the scan and scan data 300 is stably obtained, the scan progress rate may be increased.

Exemplarily, the scan progress rate may be performed by using an axis aligned bounding box (AABB) method. That is, the scan progress rate may be increased in case that the distance between the scan shot constituting the scan data 300 and the marker data (more accurately, marker unit) is within a predetermined threshold value. More specifically, the obtained scan shot may have a bounding box that forms the contour of the scan shot, and the bounding box of the scan shot may exemplarily have a cuboidal shape, Further, the center of the scan shot may be configured as the center of the bounding box of the scan shot, and a straight-line distance between the center of the bounding box of the scan shot and the center 2222 of the bounding box of the marker data (more accurately, marker unit) may be measured. If the straight-line distance is within a predetermined threshold value, it may be determined that the user has obtained the scan data to match the scan path. Exemplarily, if the straight-line distance between the center of the bounding box of the scan shot and the center 2222 of the bounding box of the marker data is within 1 cm, it may be determined that the scanning process is normally performed at a part where the marker unit 222 is located.

Meanwhile, each marker unit 222 may have the number of threshold scan shots. Exemplarily, each marker unit 222 may have 20 threshold scan shots for beginners. Accordingly, based on the number of threshold scan shots that each of the plurality of marker units 222 have, the scan progress rate corresponding to the corresponding marker unit 222 may be increased in the unit of the marker unit 222 based on the number of threshold scan shots that each of the plurality of marker units 222 has. Exemplarily, if scan shots of which the number is as many as the number of threshold scan shots are obtained for each marker unit in case that 25 marker units 222 are generated in order to display the scan path of the sample data 220, the scan progress rate per marker unit 222 may be increased by 4%.

The step (S140) of calculating the scan progress rate may be performed after the step (S130) of matching, but practically, may be performed simultaneously with the process of matching the obtained scan data 300 and the sample data 220 with each other in real time.

Meanwhile, at least a part of the marker data may be displayed in order to represent a predetermined scan path. Exemplarily, three to five marker units 222 may be successively displayed, and the number of marker units 222 being simultaneously displayed may differ depending on the scan difficulty level. Further, if the scan shots are accumulated as many as the number of threshold scan shots, the shape of the marker unit 222 may be transformed. Exemplarily, as the scan shots are obtained at the part corresponding to a certain marker unit 222, the color of the corresponding marker unit 222 may be changed. Exemplarily, as the scan shots are obtained, the color of the marker unit 222 may be sequentially changed to translucent blue, opaque blue, opaque green, and translucent green.

Meanwhile, if the scan shots as many as the number of threshold scan shots (e.g., 20 shots) are obtained at the part corresponding to the corresponding marker unit 222, the corresponding marker unit 222 may disappear, and a subsequent marker unit 222 may be displayed. Exemplarily, a first marker unit, a second marker unit, a third marker unit, a fourth marker unit, and a fifth marker unit may be displayed in order along the predetermined scan path. In this case, the first marker unit may function as the initial marker unit. The user may obtain the scan data from a part of the training model 10 corresponding to the first marker unit. If the user fully scans a part of the training model 10 corresponding to the first marker unit, and the scan shots as many as the number of threshold scan shots are obtained by the first marker unit, the first marker unit 222 may disappear, and a sixth marker unit that is the subsequent marker unit may be displayed along the predetermined scan path in a direction indicated by an arrow of the fifth marker unit. If the first marker unit disappears, the second marker unit may function as the initial marker unit. As described above, since the marker unit 222 corresponding to the fully scanned part disappears and the subsequent marker unit 222 is displayed, the user can perform the scanning process within a predictable range.

Referring to FIG. 13, if the part corresponding to the previous marker unit 222 among the marker units 222 displayed in order is not fully scanned, the subsequent marker unit 222 may not be displayed. Exemplarily, the first marker unit, the second marker unit, the third marker unit, the fourth marker unit, and the fifth marker unit may be displayed along the predetermined scan path on the sample data 220. Among the displayed marker units 222, the foremost first marker unit may function as the initial marker unit. Meanwhile, when the initial marker unit is displayed, the scan shot obtained at a part corresponding to the initial marker unit of the training model 10 may be used when the scan data is generated, and the scan shot obtained at a part that does not correspond to the initial marker unit of the training model 10 may not be used when the scan data 300 is generated. As illustrated in FIG. 13, the scan frame 250 is located at a part of the sample data 220 corresponding to the fifth marker unit. In this case, it may be determined that the user is unable to obtain a sufficient amount of scan shot at the part of the training model 10 corresponding to the first marker unit. Accordingly, it may be determined that the user has performed the scan process without following the predetermined scan path.

For the purpose of the present disclosure to improve the user's scan proficiency, it is important to obtain a sufficient amount of scan shot for one part of the training model 10 corresponding to the first marker unit that is the initial marker unit, to obtain a sufficient amount of scan shot for one part of the training model 10 corresponding to the second marker unit thereafter, and then to sequentially obtain a sufficient amount of scan shot for one part of the training model 10 corresponding to the third marker unit, the fourth marker unit, and the fifth marker unit. Accordingly, the scan shot obtained at the part corresponding to the initial marker unit may be used when the scan data 300 is generated, and may be aligned with other scan shots, and may match with the sample data 220 to be evaluated. In contrast, the scan shot obtained at the part that does not correspond to the initial marker unit when the initial marker unit is displayed may not be used when the scan data 300 is generated, and may guide the user to return to the location in which the initial marker unit is displayed and to proceed with the scan process.

Figure 14:
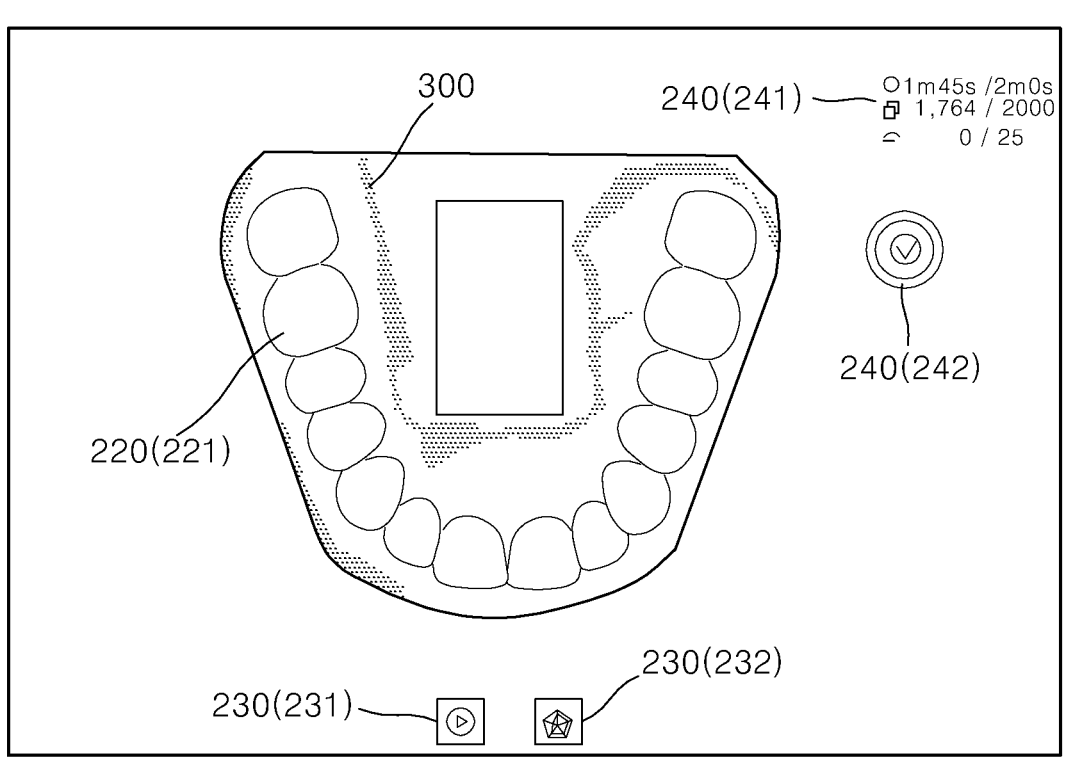
FIG. 14 is to explain a matched state of scan data and sample data with each other through completion of a scanning process.

FIG. 14 is to explain a matched state of scan data and sample data with each other through completion of a scanning process.

Referring to FIG. 14, it may be identified that the scan data 300 is obtained and matches with the sample data 220. Further, the evaluation element display unit 241 of the state display unit 240 may display a scan time and the total number of obtained scan shots, and the scan progress rate display unit 242 may display that the scan progress has been completed. The scan progress rate may appear through a change of a numerical value or a shape change of a ring-shaped loading bar.

Meanwhile, a ratio (hereinafter, matching rate) of a matching area in which the scan data 300 matches with the sample data 220 may be calculated. In this case, the matching of the scan data 300 with the sample data 220 may mean that the distance deviation between the sample data 220 and the scan data 300 is equal to or smaller than a predetermined threshold value. That is, the matching area may be an area in which the distance deviation between the sample data 220 and the scan data 300 is equal to or smaller than the predetermined threshold value. Accordingly, a matching rate that is an occupation ratio of the matching area to the entire predetermined area of the scan data 300 may be obtained. The matching rate may be included in the evaluation element, and it may be evaluated that the user's scan proficiency becomes higher as the matching rate is higher. Exemplarily, the matching rate may be obtained with respect to the area representing teeth of the scan data 300. The user may be evaluated whether the user has scanned the area representing the teeth so that the area precisely matches with the sample data 220, and accordingly, the scan proficiency can be improved.

Hereinafter, in the data processing method according to the present disclosure, a process of obtaining the matching rate that is one of the evaluation element measurement values will be described in more detail.

Figure 15:
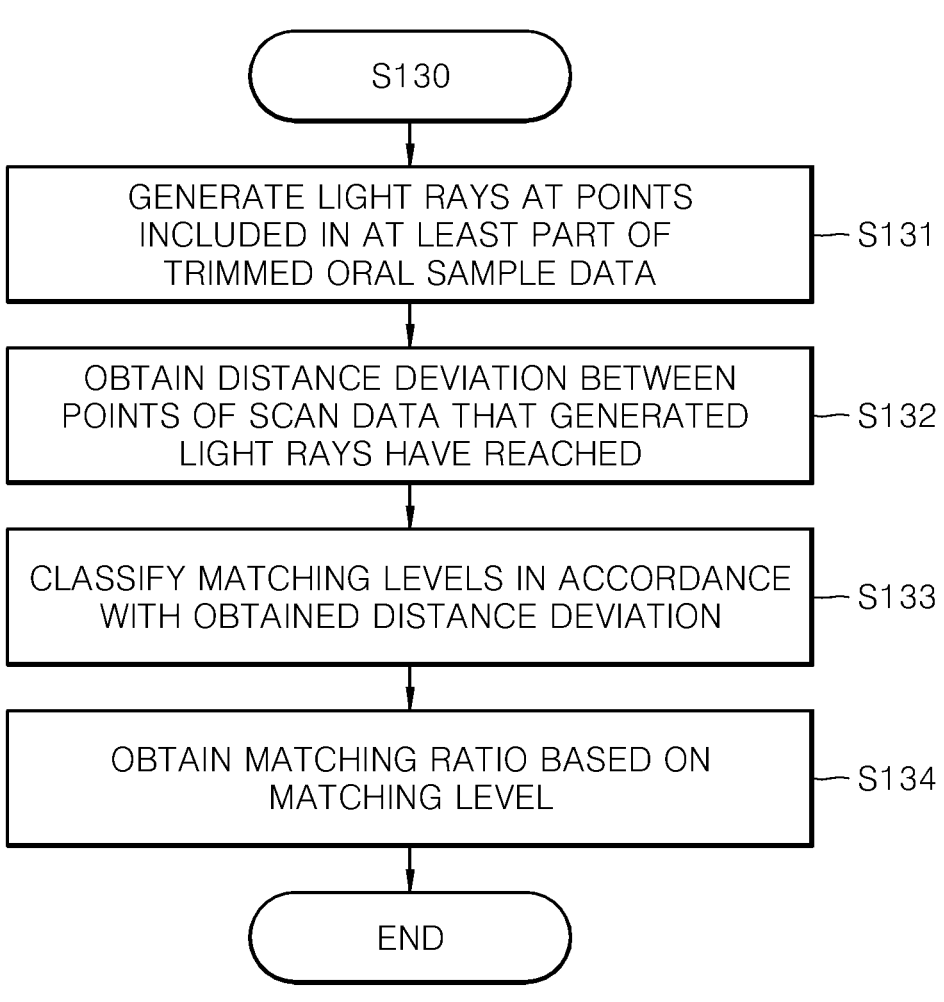
FIG. 15 is an exemplary detailed flowchart of step S130.

FIG. 15 is an exemplary detailed flowchart of step S130, and FIG. 16 is to explain a process of calculating a matching rate in step S130. More specifically, FIG. 16(*a*) illustrates a process of obtaining a cross distance through generation of light rays at a plurality of points included in the oral sample data 221, and FIG. 16(*b*) illustrates oral sample data 221' classified into at least two matching levels in accordance with the obtained cross distance.

Referring to FIG. 15, in the step (S130) of matching, at least some of a plurality of evaluation element measurement values may be collected. For the purpose of the present disclosure to improve the user's scan proficiency, the matching rate between the scan data of the evaluation element measurement values and the sample data may be considered as an important evaluation element. Accordingly, the step (S130) of matching may include a process of obtaining the matching rate among the evaluation element measurement values.

Referring to FIGS. 15 and 16(*a*), the step (S130) of matching may include a step (S131) of generating light rays at points included in at least a part of the trimmed oral sample data 221. In the present disclosure, by training to scan the training model 10, the user can improve the scan proficiency capable of precisely scanning a patient's actual oral cavity including teeth of the patient. Further, since it is important to precisely scan the teeth during dental treatment, the matching rate may be obtained with respect to a tooth area representing the teeth of the sample data 220 and a partial gingival area extended for a predetermine distance from the tooth area. Accordingly, the tooth area in the oral sample data 221 and the partial gingival area extended for the predetermined distance from the tooth area may be trimmed, and may function as areas for obtaining the matching rate.

The trimmed oral sample data 221 may include a plurality of points p1, p2, and p3. The plurality of points p1, p2, and p3 of the oral sample data 221 may constitute at least a part of the oral sample data 221 formed in a point cloud form. The plurality of points p1, p2, and p3 of the oral sample data 221 may be disposed on the surface of the oral sample data 221. The step (S131) of generating the light rays may generate the light rays (r) in a normal direction of the surface at locations where the plurality of points p1, p2, and p3 included in the oral sample data 221, respectively. In this case, the light rays (r) may include first-direction light rays (r1) propagating in a first direction of the normal direction and second-direction light rays (r2) propagating in a second direction that is opposite to the first direction of the normal direction.

Further, the light rays generated from the oral sample data 221 may reach the scan data 300. Exemplarily, the light rays (r) generated from the first point p1 may reach a fourth point p4 of the scan data 300, the light rays (r) generated from the second point p2 may reach a fifth point p5 of the scan data 300, and the light rays (r) generated from the third point p3 may reach a sixth point p6 of the scan data 300. Meanwhile, if the light rays (r) reach predetermined points p4, p5, and p6 of the scan data 300, the distance deviation between the points p1, p2, and p3 where the light rays (r) are generated and the points p4, p5, and p6 where the light rays (r) reach may be obtained (S132). In this case, the distance deviation may mean a straight-line distance between the first point p1 and the fourth point p4, a straight-line distance between the second point p2 and the fifth point p5, and a straight-line distance between the third point p3 and the sixth point p6. The distance deviation may be defined as a length (absolute value) from the oral sample data 221 to the scan data 300.

As exemplarily illustrated in FIG. 16(*a*), although it has been described that the oral sample data 221 has three points p1, p2, and p3, and the light rays (r) generated from the respective points in the both normal directions reach the scan data p4, p5, and p6, respectively, the number of points where the light rays are generated is not limited to those as illustrated in FIG. 16(*a*).

Referring to FIGS. 7, 15, 16(*a*), and 16(*b*), matching levels of the respective points p1, p2, and p3 of the oral sample data 221 may be classified (S133) depending on the distance deviation obtained in the step (S132) of obtaining the distance deviation as described above. Exemplarily, if the distance deviation is within (equal to or smaller than) a predetermined first threshold distance deviation in the step (S133) of classifying the matching levels, the point of the corresponding sample data 221 may be classified into the first matching level, and the point classified into the first matching level may correspond to a matching area 2213' on classified oral sample data 221'. Exemplarily, the point classified into the first matching level may be displayed in a first color (e.g., green).

Meanwhile, if the distance deviation exceeds a predetermined first threshold distance deviation value, and is within (equal to or smaller than) a predetermined second threshold distance deviation value, the point of the corresponding sample data 221 may be classified into the second matching level, and the point classified into the second matching level may correspond to a non-matching area 2214' on the classified oral sample data 221'. Exemplarily, the point classified into the second matching level may be displayed in a second color (e.g., red).

Further, if the distance deviation exceeds a second threshold distance deviation value, the point of the corresponding sample data 221 may be classified into the third matching level, and the point classified into the third matching level may correspond to a noise area 2215' on the classified oral sample data 221'. Exemplarily, the point classified into the third matching level may be displayed in a third color (e.g., gray).

If the matching levels of the points are classified in accordance with the step (S133) of classifying the matching levels, the matching rate may be obtained (S134) based on the classified matching levels. Exemplarily, the matching rate may be a rate of the point classified into the first matching level to the points included in the trimmed oral sample data 221. As another example, the matching rate may be a rate of the points classified into the first matching level to the sum of the points classified into the first matching level and the points classified into the second matching level. The matching rate obtained as above may function as a work element for evaluating the scan data, and the user may easily identify whether the user's scan proficiency has been improved through the matching rate.

Meanwhile, the above-described first threshold distance deviation value may be differently set depending on the scan difficulty level selected by the user. As illustrated in FIG. 7, in case of the difficulty level for beginners, the first threshold distance deviation value may be d1, and in case of the difficulty level for experts, the first threshold distance deviation value may be d2, and in case of the difficulty level for masters, the first threshold distance deviation value may be d3. Further, d1 may be larger than d2, and d2 may be larger than d3. Since different first threshold distance deviation values are set depending on the scan difficulty levels, the user can improve the scan proficiency in accordance with the scan difficulty levels.

Figure 17:
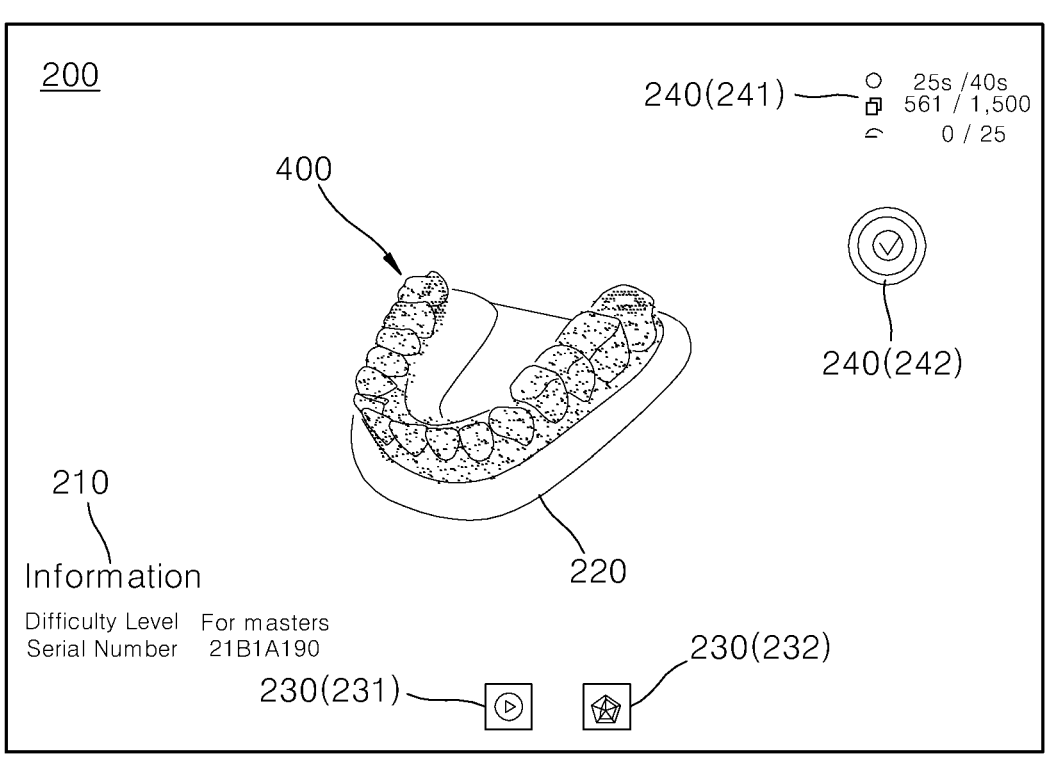
FIG. 17 is to explain a user interface screen representing reliability of scan data.

FIG. 17 is to explain a user interface screen representing reliability of scan data.

Referring to FIG. 17, reliability data 400 representing reliability of scan data 300 may be additionally displayed. The reliability data 400 enables a user to identify how accurate scan data the user has obtained by performing a scan process through a predetermined pattern or color, or a combination thereof. Exemplarily, of the reliability data 400, a red part may be expressed as a low-reliability part, a yellow part may be expressed as a middle-reliability part, and a green part may be expressed as a high-reliability part. In this case, the high-reliability part may mean a part that satisfies predetermined threshold reliability, and the reliability may be calculated based on the number of accumulated scan shots. However, unlike that as illustrated in FIG. 15, the reliability data may not be visually provided to the user, but may be indirectly provided in a numerical form through the above-described evaluation element (e.g., rate of voxel data that satisfies the threshold reliability or the number of blank areas).

Further, the reliability data 400 may display a blank area. The blank area may mean a closed loop area in which the scan process is not performed precisely when the scan data is obtained, and thus the scan data 300 is not obtained. The size of the blank area or the number of blank areas may be used as one of evaluation elements.

Figure 18:
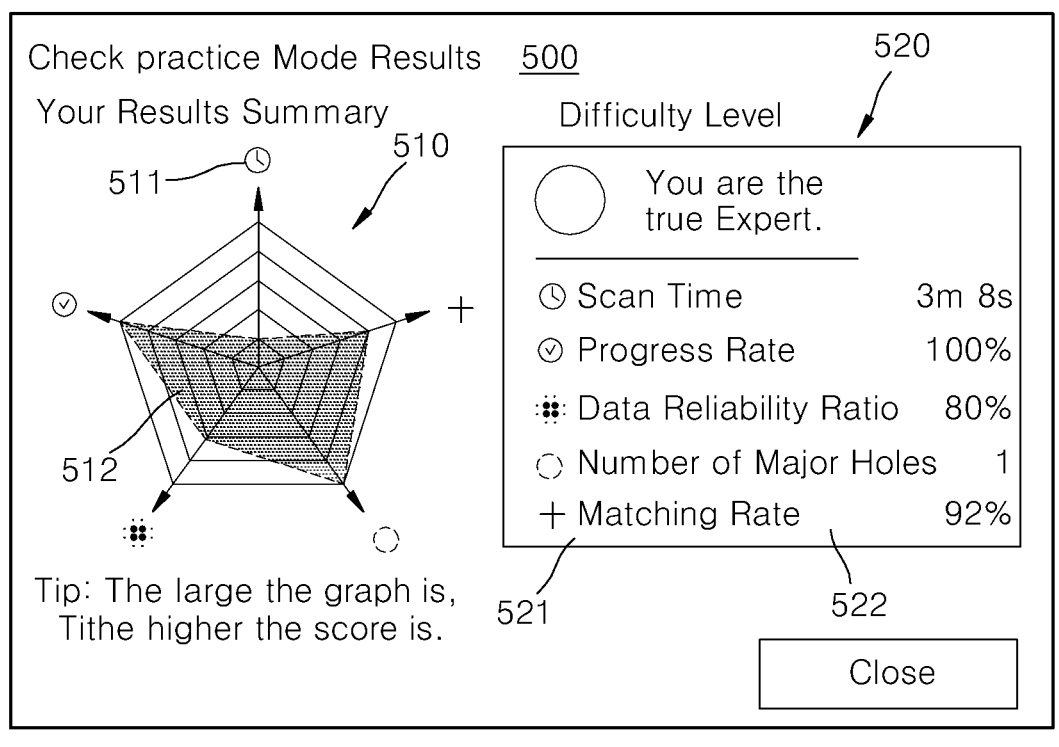
FIG. 18 is to explain the result of scan training.

FIG. 18 is to explain the result of scan training.

Referring to FIG. 18, the data processing method according to the present disclosure may include the step (S150) of evaluating scan data based on the matching result of scan data 300 and sample data 220. The step (S150) of evaluating may mean evaluating the scan data 300 through at least one evaluation element related to the scan data 300. As described above, the evaluation element may include at least one of a scan time, a ratio of voxel data satisfying threshold reliability, the scale or the number of blank areas, and a matching rate between the scan data 300 and the sample data 220. The step (S150) of evaluating may be performed in real time together with the step (S130) of matching, and may be performed based on the obtained scan data 300 after the user ends the scan process by selecting the training start/stop button 231. Exemplarily, the step (S150) of evaluating may compare the evaluation element measurement values obtained in the above-described steps (S130 and S140) with corresponding evaluation threshold values, and may score the respective evaluation element measurement values to display the same to the user. Meanwhile, exemplarily, in contrast with other evaluation elements, the matching rate among the plurality of evaluation elements may be weighted for evaluation.

As illustrated in FIGS. 17 and 18, a result window 500 may appear as the user selects the scan data evaluation button 232. The result window 500 may visually display the scan training result of the user through an evaluation graph 510 and an evaluation table 520. The evaluation graph 510 may appear as a radial graph in which respective evaluation elements 511 constitute a vertex of radial axes, and an evaluation rating for each evaluation element 511 is displayed on the radial axes. The user may visually identify the user's own scan proficiency through the evaluation graph 510, and may complement deficiencies.

Further, the evaluation table 520 may display an evaluation element measurement value 522 for each evaluation element 521. Through the evaluation table 520, the user may quantitatively identify which evaluation element 521 is insufficient in the user's own scanning process, and may complement the deficiencies.

As described above, according to the data processing method according to the present disclosure, the user may repeatedly perform the scanning process through the provided training model 10 and the sample data 220 that is digital data of the training model 10, and may evaluate the result according to the scanning process. Thus, according to the data processing method according to the present disclosure, the user can precisely evaluate the user's own scan proficiency, and can improve the scan proficiency in a short time. Further, the user can gradually challenge the high scan difficulty level by selecting the scan difficulty level, and thus the user's scan proficiency can be naturally improved.

Hereinafter, a data processing system that performs the data processing method according to the present disclosure will be described. Meanwhile, in describing the data processing system according to the present disclosure, the contents already described in the above-described data processing method according to the present disclosure may be simply mentioned, or description thereof may be omitted.

Figure 19:
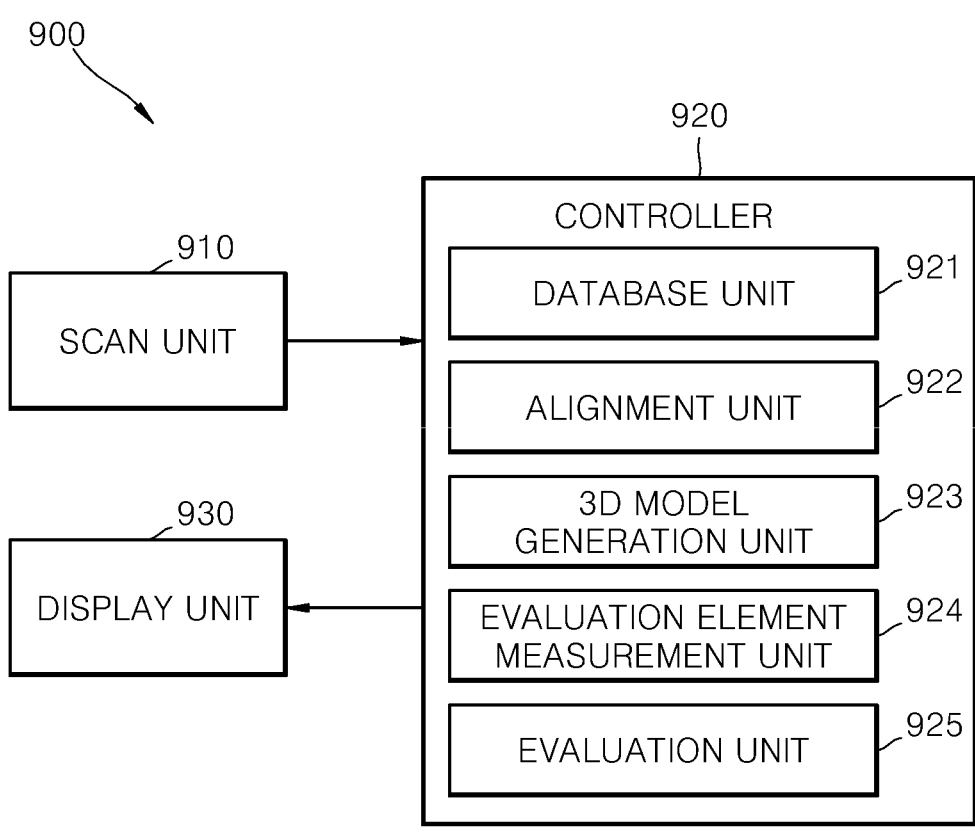
FIG. 19 is a schematic configuration diagram of a data processing system which performs a data processing method according to the present disclosure.
Figure 20:
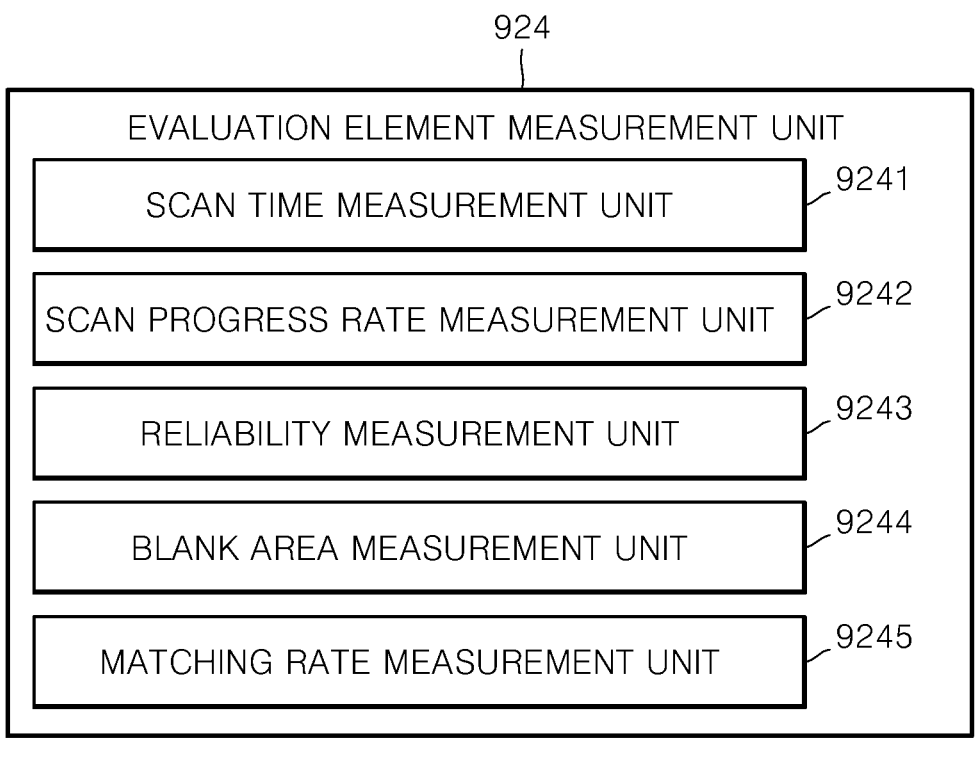
FIG. 20 is a schematic configuration diagram of an evaluation element measurement unit in a data processing system according to the present disclosure.

FIG. 19 is a schematic configuration diagram of a data processing system which performs a data processing method according to the present disclosure, and FIG. 20 is a schematic configuration diagram of an evaluation element measurement unit in a data processing system according to the present disclosure.

Referring to FIGS. 19 and 20, a data processing system 900 that performs the data processing method according to the present disclosure may include a scan unit 910, a controller 920, and a display unit 930.

The scan unit 910 may have a built-in camera that can detect the above-described training model, and may obtain scan data including a plurality of scan shots by scanning the training model. If needed, the scan unit 910 may be additionally provided with a light projector for illuminating the training model. Exemplarily, the scan unit 910 may be a handheld type 3D scanner. The scan unit 910 may obtain image data representing the training model, and may transmit the obtained image data to the controller 920.

The controller 920 may perform a predetermined arithmetic processing by using the image data input from the scan unit 910. Exemplarily, the controller 920 may include a microprocessor which can perform the arithmetic processing. Further, the controller 920 may communicate with the scan unit 910 and the display unit 930. The scan unit 910 may be wiredly or wirelessly connected to the controller 920 for data communication with the controller 920.

The controller 920 may include a database unit 921. The database unit 921 may store therein sample data of the training model, alignment logic of scan shots, 3D model generation logic, evaluation threshold value data, marker data generation logic, evaluation element measurement logic, and scan data. The database unit 921 may provide data necessary for respective unit constitutions. Meanwhile, the sample data may be pre-stored in the database unit 921, or may be downloaded.

The controller 920 may include an alignment unit 922. The alignment unit 922 may perform alignment between scan shots in the scan data input in the form of a plurality of scan shots. Further, the alignment unit 922 may perform alignment of the scan data and the sample data in an alignable area of the sample data as described above.

Further, the controller 920 may include a 3D model generation unit 923. The 3D model generation unit 923 may merge the obtained scan data into 3D model.

Further, the controller 920 may include an evaluation element measurement unit 924. The evaluation element measurement unit 924 may collect evaluation element measurement values related to the obtained scan data. As described above, the evaluation element may include a scan time, a scan progress rate, a ratio of voxel data satisfying threshold reliability, the number of blank areas, and a matching rate. The evaluation element measurement values may be collected in accordance with logic collecting the respective evaluation element measurement values.

Exemplarily, the evaluation element measurement unit 924 may include a scan time measurement unit 9241, a scan progress rate measurement unit 9242, a reliability measurement unit 9243, a blank area measurement unit 9244, and a matching rate measurement unit 9245. The scan time measurement unit 9241 may obtain an elapsed time between a scan start time and a scan end time for scan training. The scan progress rate measurement unit 9242 may obtain the scan progress rate based on a distance between the scan shot and marker data, and the process of obtaining the scan progress rate is the same as that as described above.

Further, the reliability measurement unit 9243 may collect the reliability of the scan data. The reliability of the scan data may represent whether the user has obtained the scan data having sufficient reliability. The blank area measurement unit 9244 may collect the number of data blank areas or the size of the blank area, which is not obtained in the user's scanning process. The blank area may be represented in the form of a closed loop area in the scan data.

Further, the matching rate measurement unit 9245 may collect the matching rate representing whether the scan data and the sample data match with each other in a similar manner. The process of obtaining the matching rate is the same as that in the above-described contents, and the detailed description thereof will be omitted.

Meanwhile, the controller 920 may include an evaluation unit 925. The evaluation unit 925 may compare the evaluation element measurement value collected by the evaluation element measurement unit 924 with the evaluation threshold value stored in the database unit 921. In this case, the evaluation unit 925 may set different evaluation threshold values depending on the scan difficulty level selected by the user. The evaluation unit 925 may evaluate the user's skill by synthesizing the evaluation element measurement values collected with respect to the plurality of evaluation elements. Exemplarily, the evaluation result may be represented by a radial graph and numerical values.

Meanwhile, at least some of operation performing processes of the controller 920 may be displayed through the display unit 930. As the display unit 930, a known visual display device may be used. Exemplarily, as the display unit 930, at least one of a monitor, a tablet, and a touchscreen may be used, but the display unit 930 is not limited to the enumerated examples. The user can easily identify the scan training process and the scan training result through the display unit 930, and thus the user's scan proficiency can be efficiently improved.

The data processing system according to the present disclosure as described above performs the data processing method according to the present disclosure, and thus shares the features and advantages that the data processing method has.

The above explanation of the present disclosure is merely for exemplary explanation of the technical idea of the present disclosure, and various changes and modifications may be possible in a range that does not deviate from the essential characteristics of the present disclosure by those of ordinary skill in the art to which the present disclosure pertains.

Accordingly, embodiments disclosed in the present disclosure are not to limit the technical idea of the present disclosure, but to explain the technical idea, and the scope of the technical idea of the present disclosure is not limited by such embodiments. The scope of the present disclosure should be interpreted by the appended claims, and all technical ideas in the equivalent range should be interpreted as being included in the scope of the present disclosure.

INDUSTRIAL APPLICABILITY

The present disclosure provides a data processing method that can improve the user's scan proficiency by evaluating the scan data through matching of the sample data being loaded and provided through the user interface and the scan data obtained by the user to scan the training model with each other.

The invention claimed is:

1. A data processing method for scan training, comprising:
loading at least a part of sample data corresponding to a training model into a user interface;
matching scan data obtained by scanning the training model with the sample data; and
evaluating the scan data based on the result of matching the scan data and the sample data with each other,
wherein the sample data comprises an alignable area that is aligned with the scan data associated with an initial scan location of the training model, and a non-alignable area that is not aligned with the scan data.

2. The data processing method for scan training of claim 1, wherein the training model has an initial scan location corresponding to the alignable area, and wherein the scan data obtained by scanning the initial scan location is aligned with the sample data.

3. The data processing method for scan training of claim 1, wherein the scan data comprises a plurality of scan shots, wherein the scan shots obtained from a part corresponding to the alignable area of the training model are aligned with the sample data, and
wherein the scan shots obtained from a part corresponding to the non-alignable area of the training model are mutually aligned with each other.

4. The data processing method for scan training of claim 1, wherein the loading loads marker data including an initial marker unit together on the sample data,
wherein the marker data represents a predetermined scan path for obtaining the scan data.

5. The data processing method for scan training of claim 4, wherein in case that the initial marker unit is displayed, a scan shot obtained from a part that corresponds to the initial marker unit of the training model is used when the scan data is generated, and
wherein a scan shot obtained from a part that does not correspond to the initial marker unit of the training model is not used when the scan data is generated.

6. The data processing method for scan training of claim 4, wherein the marker data comprises a plurality of marker units, and
wherein at least some of the marker units are formed spaced apart for a predetermined distance from the sample data.

7. The data processing method for scan training of claim 4, further comprising calculating a scan progress rate of the training model based on the obtained scan data.

8. The data processing method for scan training of claim 7, wherein the scan progress rate is increased in case that a distance between at least one scan shot constituting the scan data and the marker data is within a predetermined threshold value.

9. The data processing method for scan training of claim 8, wherein the scan progress rate is increased in the unit of a marker unit based on the number of threshold scan shots owned by a plurality of marker units included in the marker data.

10. The data processing method for scan training of claim 8, wherein the distance between the scan shot and the marker data is a distance between a center of a bounding box that forms a contour of the scan shot and a center of a bounding box that forms a contour of the marker data.

11. The data processing method for scan training of claim 7, wherein at least a part of the marker data is displayed in order to represent a predetermined scan path, and
wherein the scan progress rate is increased in case that a scan shot corresponding to a part on which the marker data is displayed.

12. The data processing method for scan training of claim 6, wherein the scan data corresponding to the displayed marker unit is obtained over a threshold scan shot, a subsequent marker unit is displayed.

13. The data processing method for scan training of claim 1, wherein the evaluating evaluates the scan data through at least one evaluation element related to the scan data.

14. The data processing method for scan training of claim 13, wherein the evaluation element is allocated with a predetermined evaluation threshold value in accordance with difficulty level information input from a user.

15. The data processing method for scan training of claim 13, wherein the evaluation element comprises at least one of a scan time, a ratio of voxel data satisfying threshold reliability, the number of blank areas, and a matching rate between the scan data and the sample data.

16. The data processing method for scan training of claim 15, wherein the matching rate is a ratio of a matching area of the scan data and the sample data to a predetermined area of the scan data, and wherein the matching area is an area of the scan data in which a deviation between the sample data and the scan data is equal to or smaller than a predetermined threshold value.

17. The data processing method for scan training of claim 15, wherein the matching rate is obtained with respect to an area representing teeth of the scan data.

18. The data processing method for scan training of claim 1, wherein the matching comprises:

generating light rays from a plurality of points included in the sample data;

obtaining a distance deviation between points of the scan data reached by the light rays;

classifying a matching level between the scan data and the sample data in accordance with the distance deviation; and obtaining a matching rate based on the matching level.

19. The data processing method for scan training of claim 18, wherein the plurality of points are included in trimmed oral sample data including a tooth area representing a tooth, and a partial gingival area extended for a predetermined distance from the tooth area among the sample data.

* * * * *